(12) United States Patent
Matsui et al.

(10) Patent No.: US 11,553,773 B2
(45) Date of Patent: Jan. 17, 2023

(54) CONTROL METHOD OF HEAT BLOWER SYSTEM

(71) Applicant: PANASONIC INTELLECTUAL PROPERTY MANAGEMENT CO., LTD., Osaka (JP)

(72) Inventors: Yasunori Matsui, Shiga (JP); Hayato Kikuchi, Shiga (JP); Mayuka Kambayashi, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 373 days.

(21) Appl. No.: 16/838,902

(22) Filed: Apr. 2, 2020

(65) Prior Publication Data
US 2020/0323326 A1    Oct. 15, 2020

(30) Foreign Application Priority Data

Apr. 11, 2019    (JP) .............................. JP2019-075516

(51) Int. Cl.
*F26B 3/02*    (2006.01)
*A45D 20/12*    (2006.01)
*H05B 1/02*    (2006.01)

(52) U.S. Cl.
CPC ........... *A45D 20/12* (2013.01); *H05B 1/0252* (2013.01); *H05B 1/0297* (2013.01); *A45D 2200/202* (2013.01)

(58) Field of Classification Search
CPC ........ A45D 20/12; A45D 20/00; A45D 20/10; A45D 2200/202; H05B 1/0252; H05B 1/0297

(Continued)

(56) References Cited

U.S. PATENT DOCUMENTS 8,938,888 B1    1/2015    Brown
2009/0151190 A1*    6/2009    Anderson ............. F26B 21/001
    34/543

(Continued)

FOREIGN PATENT DOCUMENTS

DE    102017211783 A1    1/2019
EP    2567632 A1    3/2013

(Continued)

OTHER PUBLICATIONS

The Extended European Search Report dated Feb. 10, 2021 for the related European Patent Application No. 20167722.6.

(Continued)

*Primary Examiner* — John P McCormack
(74) *Attorney, Agent, or Firm* — McDermott Will & Emery LLP

(57) ABSTRACT

Heat blower system includes: hair dryer that has housing, fan, and heater; and program that controls hair dryer. Program has a step of obtaining at least one outdoor environment information among an outdoor temperature, an outdoor humidity, an outdoor wind speed, a day length, and an ultraviolet ray intensity. Program further has a step of calculating at least one operational condition of an air volume or an air temperature of hair dryer, based on the obtained outdoor environment information. According to the present aspect, outdoor environment information such as the outdoor temperature, the outdoor humidity, the outdoor wind speed, the day length, and the ultraviolet ray intensity can comprehensively be obtained to adjust operational conditions of hair dryer, appropriately.

9 Claims, 14 Drawing Sheets

(58) Field of Classification Search
USPC .................................... 392/380; 34/96, 283
See application file for complete search history.

(56) References Cited

U.S. PATENT DOCUMENTS

| | | |
|---|---|---|
| 2015/0289623 A1 | 10/2015 | Matsui et al. |
| 2016/0316883 A1* | 11/2016 | Guerra ..................... A45D 6/20 |
| 2018/0058710 A1* | 3/2018 | Lewis ...................... F24F 11/30 |

FOREIGN PATENT DOCUMENTS

| | | | |
|---|---|---|---|
| JP | 2006288873 A | * 10/2006 | ............. D06F 25/00 |
| JP | 2009-095482 A | 5/2009 | |
| JP | 2015-202129 A | 11/2015 | |
| JP | 5923146 B2 | 5/2016 | |
| JP | 2018-089209 A | 6/2018 | |
| WO | 2018/023117 A1 | 2/2018 | |

OTHER PUBLICATIONS

The Extended European Search Report dated Feb. 10, 2021 for the related European Patent Application No. 20206742.7.

\* cited by examiner

FIG. 10

|  | Moist | Smooth | Damage control / restoration |
|---|---|---|---|
| Air volume | Less than or equal to 1.0 m$^3$ /min | More than or equal to 1.0 m$^3$ /min | More than or equal to 0.7 m$^3$ /min |
| Air temperature | 60~80°C | 80~120°C | ~100°C |
| Amount of ions | Small | Large | Medium |
| Amount of charged particle liquid | Large | Small | Medium |
| Amount of acid components | Medium | Medium | Large |
| Amount of transition metal fine particles | Medium | Medium | Large |

FIG. 11

| | | | Environment information |||||||
|---|---|---|---|---|---|---|---|---|---|
| | | | Outdoor temperature || Outdoor humidity || Day length || Ultraviolet ray intensity ||
| | | | High | Low | High | Low | Long | Short | Strong | Weak |
| Operational condition | Air volume | Large | O | | | | | | | |
| | | Small | | O | | | | | | |
| | Air temperature | High | | O | | | | | | |
| | | Low | O | | | | | | | |
| | Amount of ions | Large | | | O | | | | | |
| | | Small | | | | O | | | | |
| | Amount of charged particle liquid | Large | | | O | | | | | |
| | | Small | | | | O | | | | |
| | Amount of acid components | Large | | | | | O | | O | |
| | | Small | | | | | | O | | O |
| | Amount of transition metal fine particles | Large | | | | | O | | O | |
| | | Small | | | | | | O | | O |

FIG. 12

| | | | Environment information | | | | | |
|---|---|---|---|---|---|---|---|---|
| | | | Season (month and day, place) | | | | Weather | |
| | | | Spring or autumn | Rainy season | Summer | Winter | Fine | Rain |
| Operational condition | Air volume | Large | ○ | | ○ | | ○ | ○ |
| | | Small | | | | ○ | | |
| | Air temperature | High | ○ | | | ○ | | |
| | | Low | | ○ | ○ | | ○ | ○ |
| | Amount of ions | Large | ○ | | | | ○ | |
| | | Small | ○ | ○ | ○ | ○ | ○ | |
| | Amount of charged particle liquid | Large | | ○ | | ○ | | ○ |
| | | Small | | | ○ | | ○ | |
| | Amount of acid components | Large | ○ | ○ | ○ | | ○ | ○ |
| | | Small | | | ○ | ○ | ○ | |
| | Amount of transition metal fine particles | Large | ○ | ○ | | ○ | | |
| | | Small | | | | | | ○ |

FIG. 13

| | | | User information | | | | | |
|---|---|---|---|---|---|---|---|---|
| | | | Hair quality | | | Request | | |
| | | | Length or volume | Curl | Damage | Desire to moisturize hair | Desire to smoothen hair | Desire to straighten curly hair | Desire to care damaged hair |
| Operational condition | Air volume | Large | O | | | O | O | | |
| | | Small | | O | O | | | O | O |
| | Air temperature | High | O | O | | | | O | |
| | | Low | | | O | O | O | O | O |
| | Amount of ions | Large | O | O | | O | O | | O |
| | | Small | | | O | | | | |
| | Amount of charged particle liquid | Large | O | O | O | O | O | | O |
| | | Small | | | | | | | |
| | Amount of acid components | Large | O | O | O | O | O | O | O |
| | | Small | | | | | | | |
| | Amount of transition metal fine particles | Large | O | | O | | O | | O |
| | | Small | | O | | | O | O | |

CONTROL METHOD OF HEAT BLOWER SYSTEM

CROSS-REFERENCE OF RELATED APPLICATIONS

This application claims the benefit of Japanese Application No. 2019-075516, filed on Apr. 11, 2019, the entire disclosures of which Applications are incorporated by reference herein.

BACKGROUND OF THE INVENTION

1. Field of the Invention

The present disclosure relates to a control method of a heat blower system.

2. Description of the Related Art

Conventionally, Unexamined Japanese Patent Publication No. 2015-202129 discloses a heat blower system that includes a heat blower having a fan and a heater that are provided inside a housing, and a program for controlling the heat blower, for example.

The heat blower system detects indoor environment information, such as room temperature, to control temperature of air from the heat blower.

SUMMARY OF THE INVENTION

However, hair condition does not always depend on indoor environment when a heat blower is used. Therefore, it may be difficult for the above-mentioned heat blower system to adjust operational conditions of the heat blower, appropriately.

An object of the present disclosure is to propose a heat blower system capable of obtaining outdoor environment information, such as an outdoor temperature, an outdoor humidity, an outdoor wind speed, a day length, and an ultraviolet ray intensity, comprehensively to adjust the operational conditions of the heat blower, appropriately.

A first aspect of the present disclosure is a control method of a heat blower system including a heat blower that has a fan and a heater, which are disposed in a housing.

The control method of the heat blower system in the present aspect has: a step of obtaining at least one outdoor environment information among an outdoor temperature, an outdoor humidity, an outdoor wind speed, a day length, and an ultraviolet ray intensity; and a step of determining at least one operational condition of an air volume or an air temperature of the heat blower, based on the obtained outdoor environment information.

A second aspect of the present disclosure is a control method of a heat blower system including a heat blower that has a fan and a heater, which are disposed in a housing.

The heat blower system further includes: an information server that has at least one outdoor environment information among an outdoor temperature, an outdoor humidity, an outdoor wind speed, a day length, and an ultraviolet ray intensity; and a calculation server that determines at least one operational condition of an air volume or an air temperature of the heat blower, based on the at least one outdoor environment information among the outdoor temperature, the outdoor humidity, the outdoor wind speed, the day length, and the ultraviolet ray intensity.

The control method of the heat blower system in the present aspect has: a step of obtaining the at least one outdoor environment information from the information server; a step of providing the obtained outdoor environment information to the calculation server; and a step of obtaining the at least one operational condition from the calculation server.

A third aspect of the present disclosure is a control method of a heat blower system including a heat blower that has a fan and a heater, which are disposed in a housing.

The heat blower system further includes a position measuring device that calculates, based on a position of the heat blower, local information about a place where the heat blower is used, a timer that has time information, an information server that has weather information, and a calculation server that determines outdoor environment information from the local information, the time information, and the weather information.

The control method of the heat blower system in the present aspect has: a step of obtaining, from the position measuring device, the local information about a place where the heat blower is used; a step of obtaining, from the timer, the time information about time when the heat blower is used; a step of obtaining the weather information from the information server; and a step of providing the obtained local information, the obtained time information, and the obtained weather information to the calculation server. The control method of the heat blower system in the present aspect further has: a step of obtaining outdoor environment information from the calculation server; a step of providing the obtained outdoor environment information to the calculation server; and a step of obtaining at least one operational condition from the calculation server.

The present disclosure can propose the heat blower system capable of obtaining outdoor environment information, such as the outdoor temperature, the outdoor humidity, the outdoor wind speed, the day length, and the ultraviolet ray intensity, comprehensively to adjust the operational conditions of the heat blower appropriately.

BRIEF DESCRIPTION OF DRAWINGS

FIG. 10 is a chart exemplarily showing the operational conditions of the heat blower, depending on finishing information;

FIG. 11 is a chart showing a relationship between environment information and the operational conditions of the heat blower, such as an outdoor temperature and an outdoor humidity;

FIG. 12 is a chart showing a relationship between environment information, such as a season, and the operational conditions of the heat blower;

FIG. 13 is a chart showing a relationship between user information and the operational conditions of the heat blower.

DETAILED DESCRIPTION OF THE PREFERRED EMBODIMENTS

Hereinafter, an exemplary embodiment of the present disclosure will be described with reference to the drawings.

First, hair dryer 1, which is a heat blower in accordance with the present exemplary embodiment, will be described with reference to FIGS. 1 through 8B.

Figure 1:
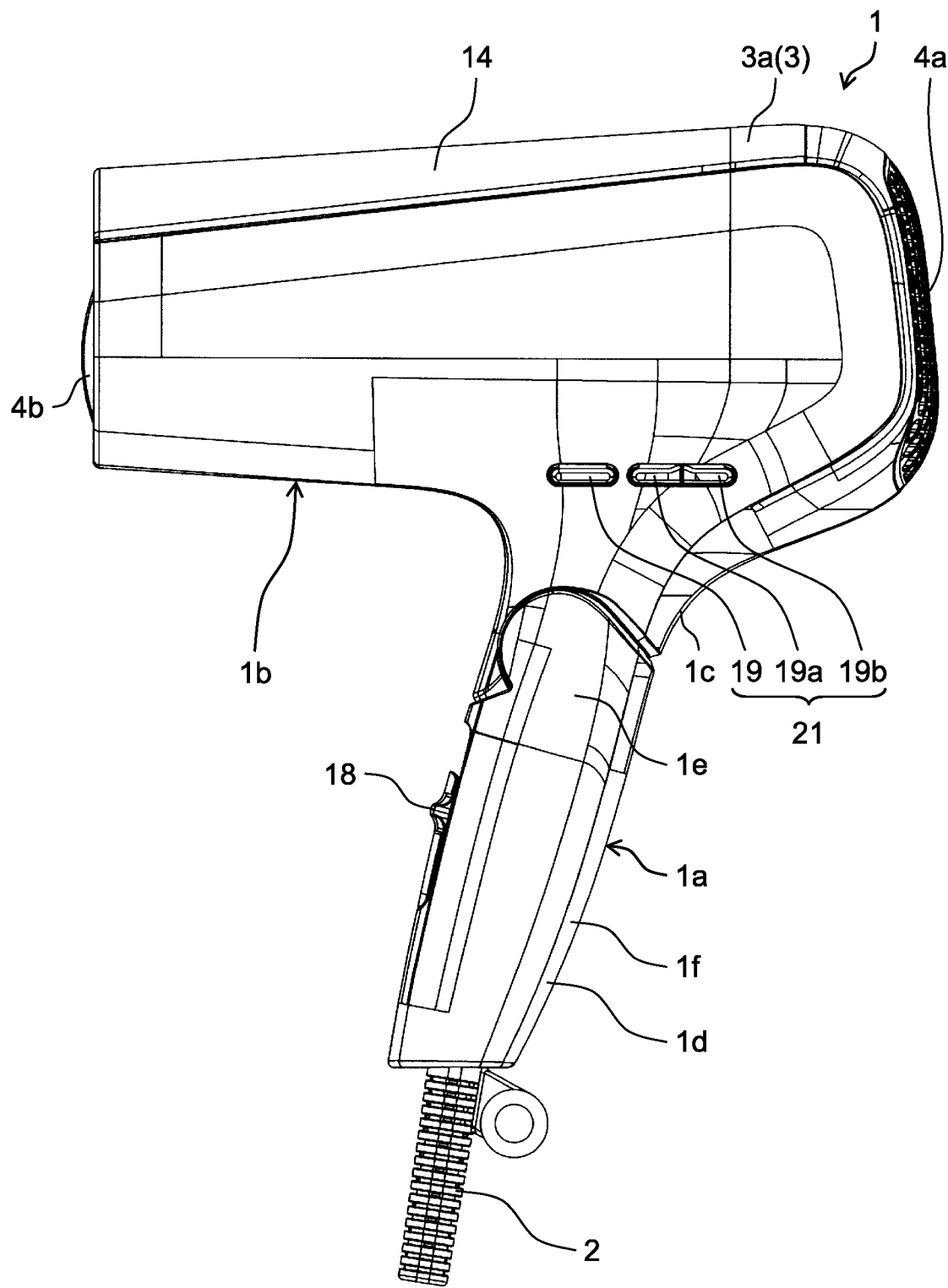
FIG. 1 is a side view of a heat blower in accordance with an exemplary embodiment of the present disclosure.
Figure 2:
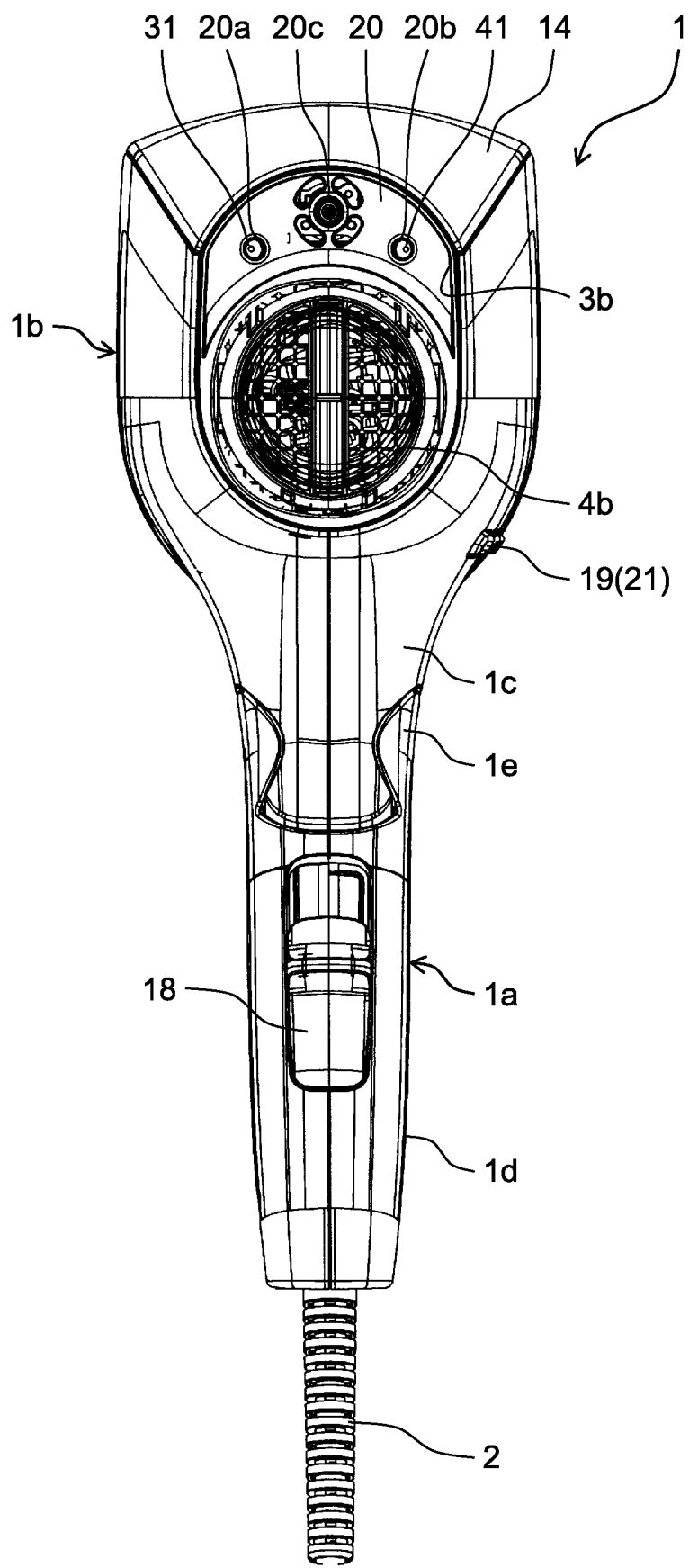
FIG. 2 is a front view of the heat blower in accordance with the exemplary embodiment of the present disclosure.
Figure 3:
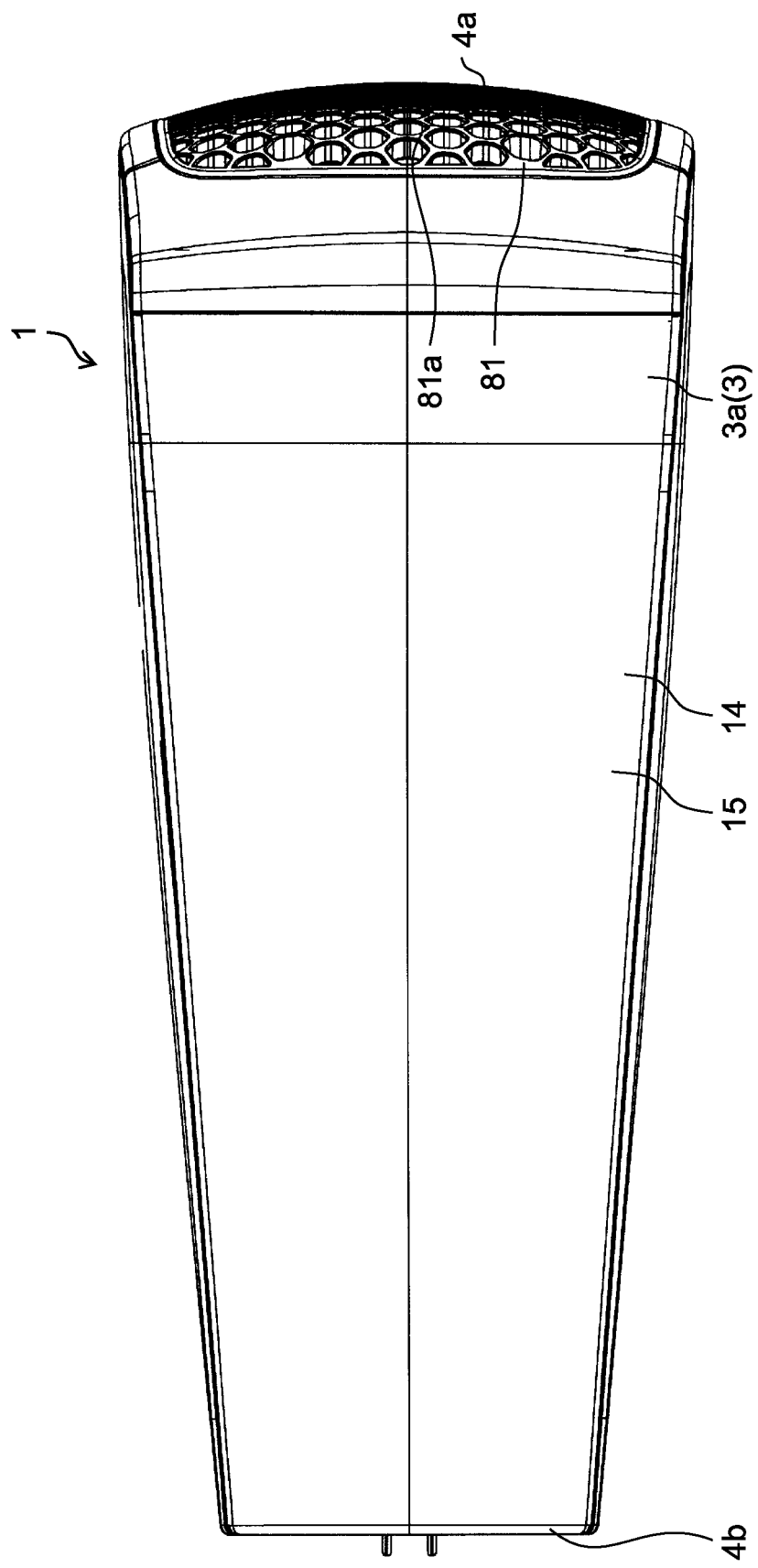
FIG. 3 is a plan view of the heat blower in accordance with the exemplary embodiment of the present disclosure.
Figure 4:
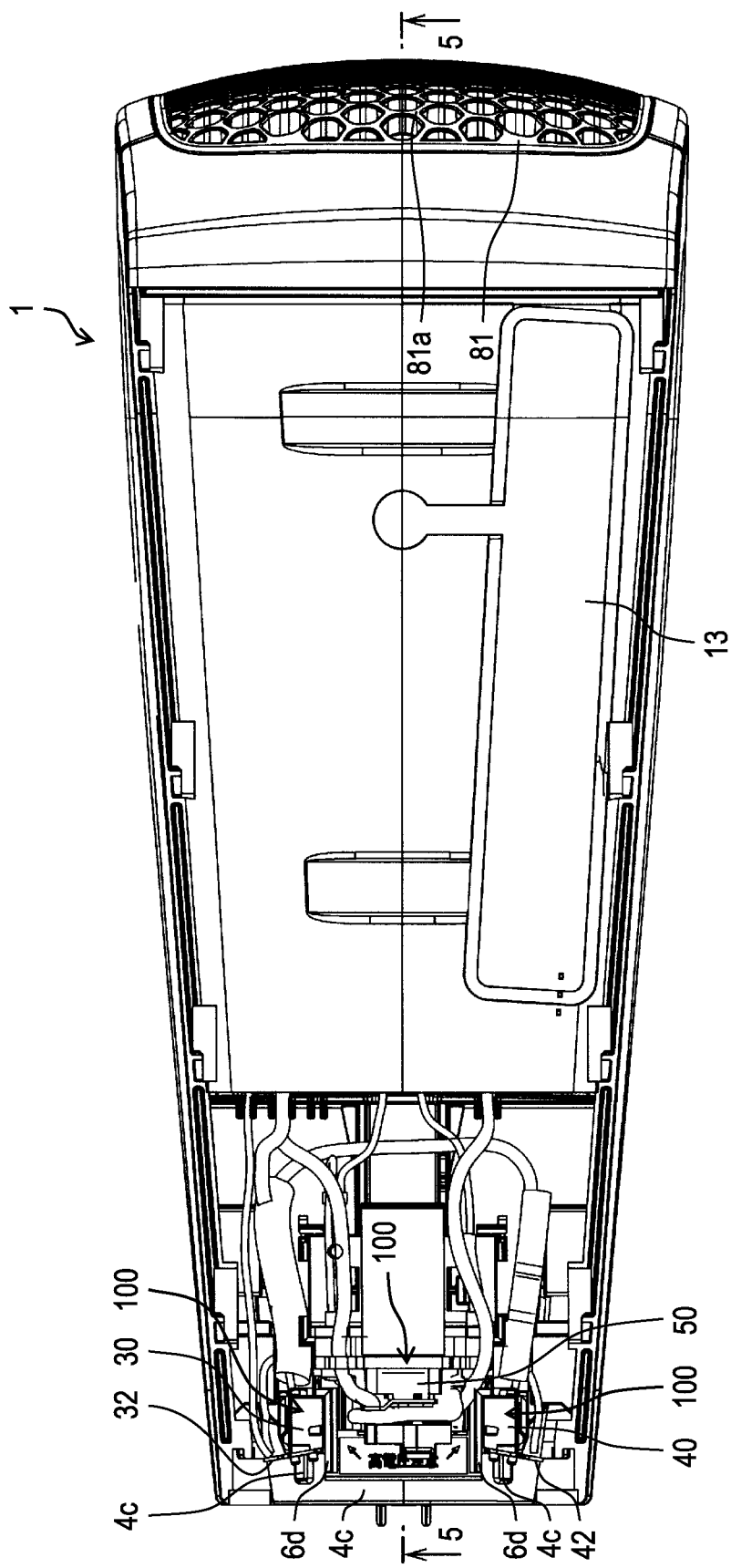
FIG. 4 is a plan view of the heat blower in accordance with the present exemplary embodiment with a part of housing removed.
Figure 5:
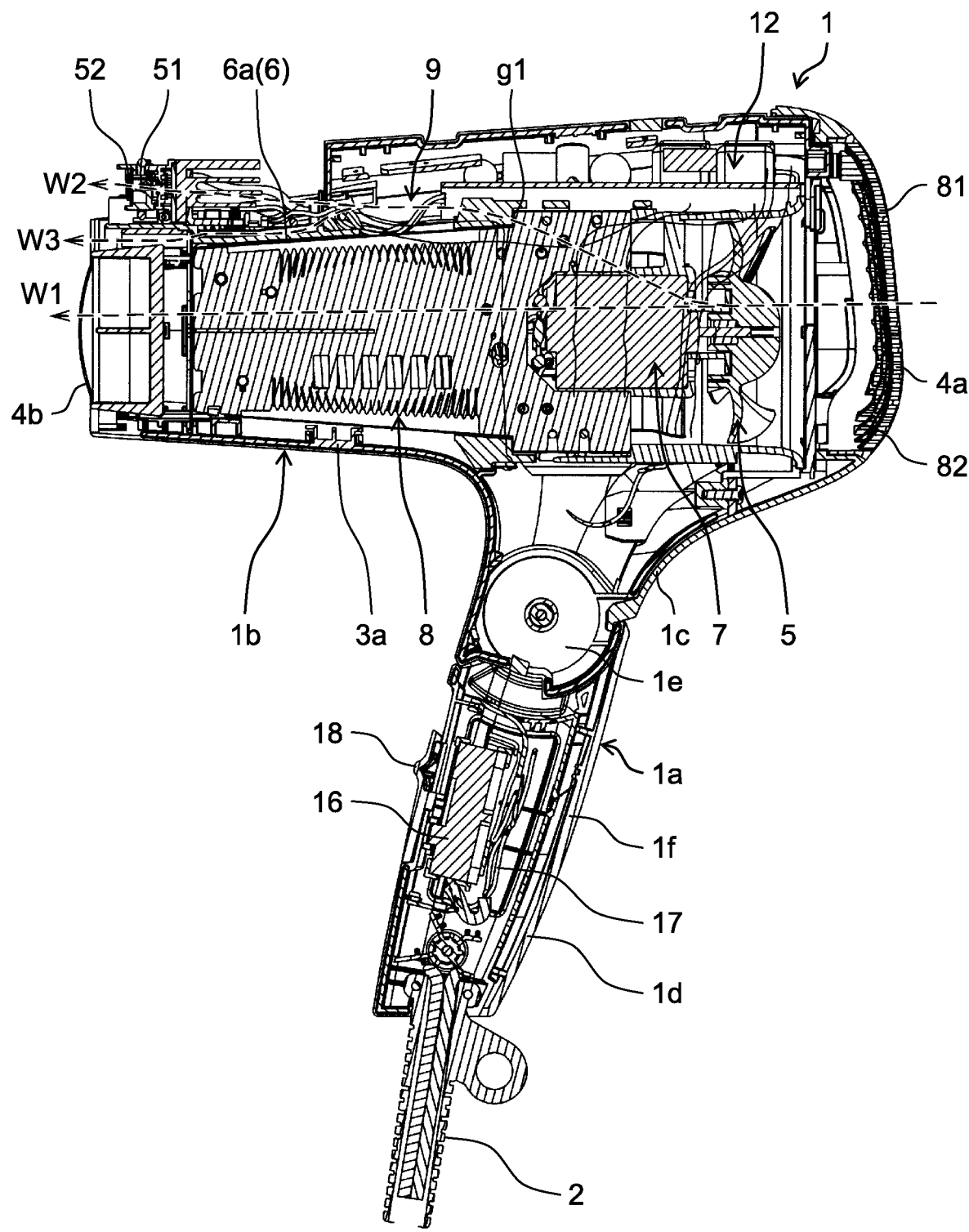
FIG. 5 is a cross-sectional view of the heat blower in accordance with the present exemplary embodiment taken along 5-5 line in FIG. 4.
Figure 6:
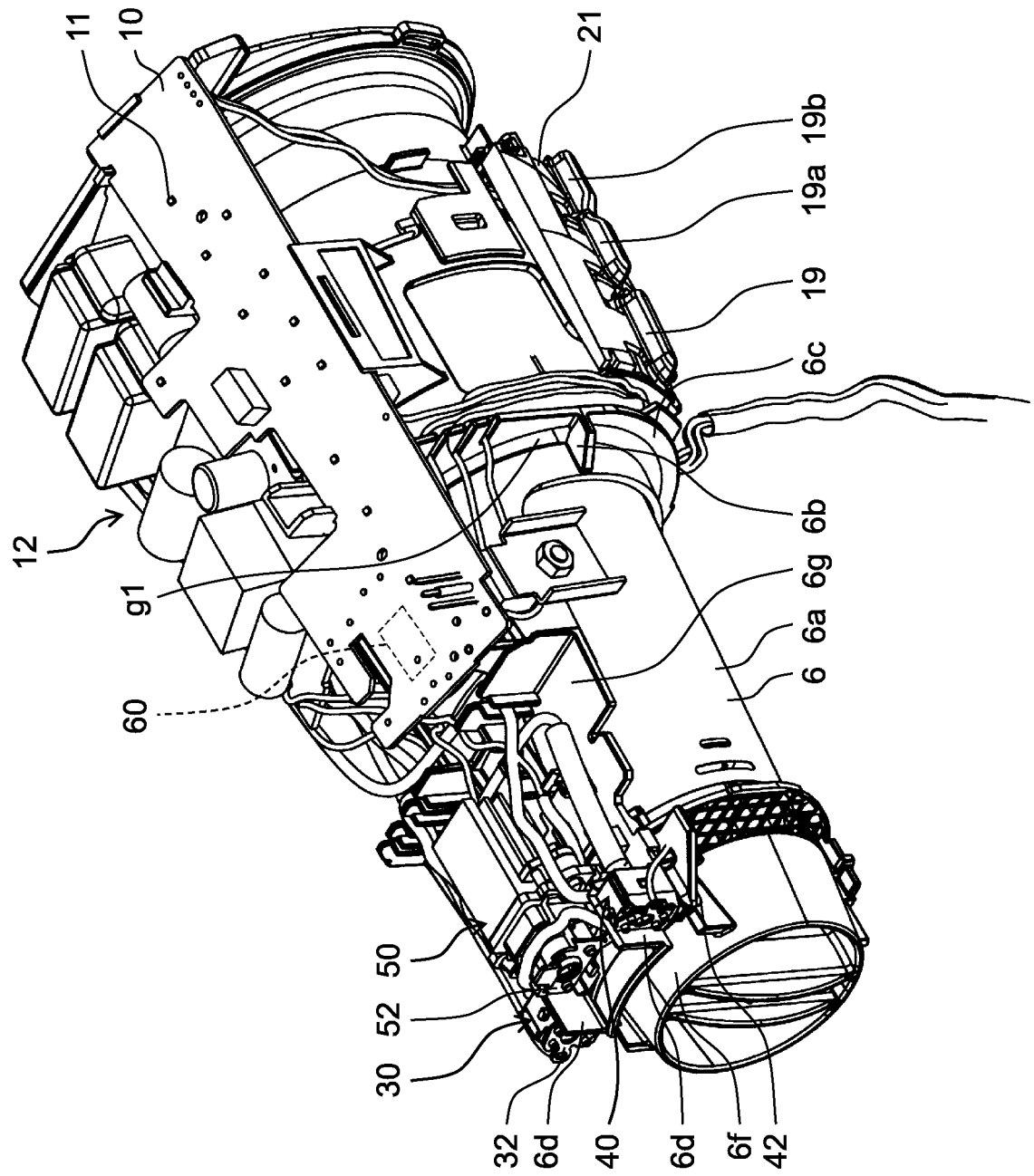
FIG. 6 is a perspective view of a body of the heat blower in accordance with the present exemplary embodiment with the housing removed.
Figure 7:
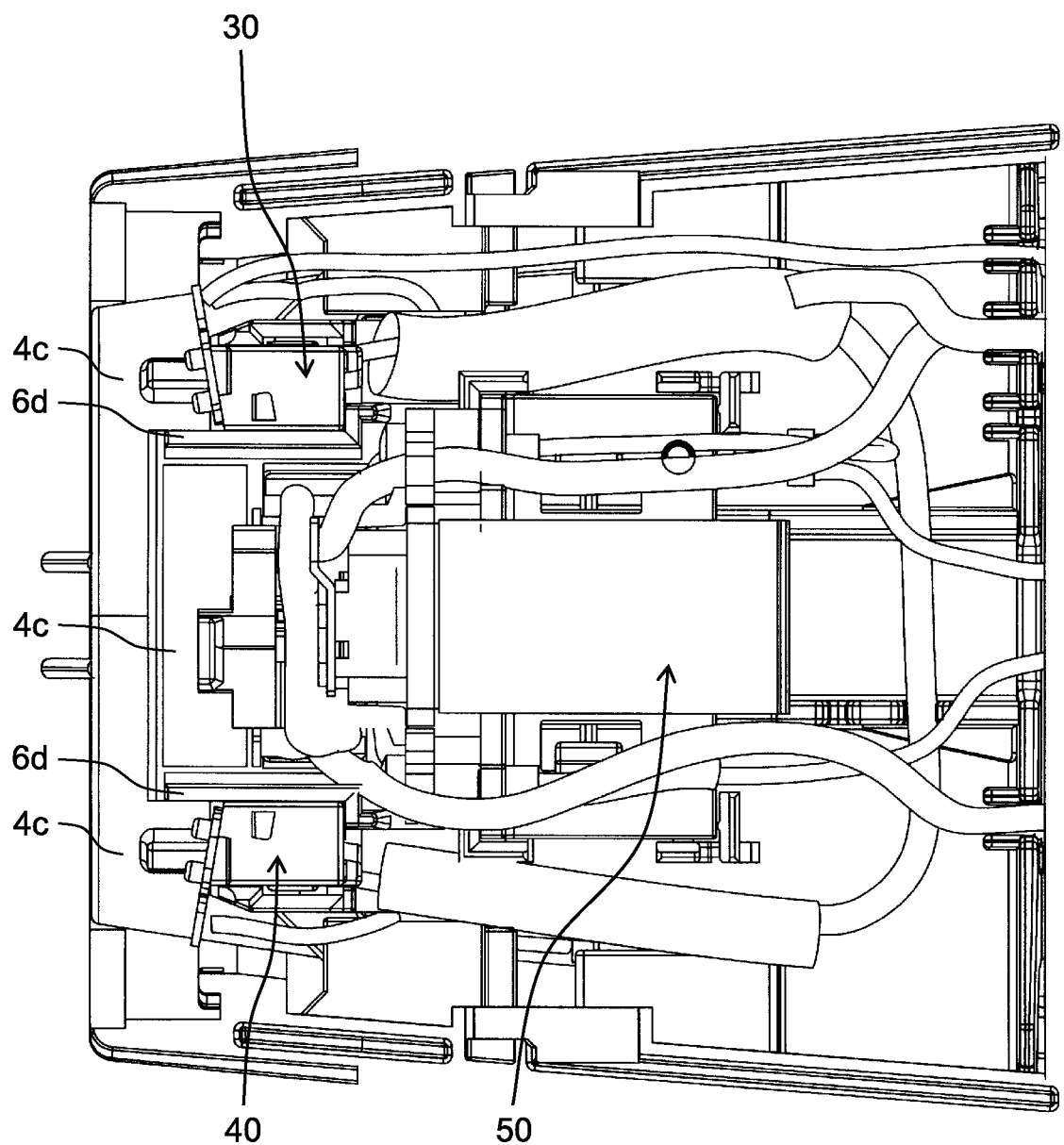
FIG. 7 is an enlarged plan view of the body of the heat blower in accordance with the present exemplary embodiment with the housing removed.

FIG. 1 is a side view of hair dryer 1. FIG. 2 is a front view of hair dryer 1. FIG. 3 is a plan view of hair dryer 1. FIG. 4 is a plan view of hair dryer 1 with a part of housing 3 removed. FIG. 5 is a cross-sectional view of hair dryer 1 taken along 5-5 line in FIG. 4. FIG. 6 is a perspective view of body 1b of hair dryer 1 with housing 3 removed. FIG. 7 is an enlarged plan view of body 1b of hair dryer 1 with housing 3 removed.

As shown in FIGS. 1, 2, and 5, hair dryer 1 includes grip 1a and body 1b. Grip 1a is a portion that is coupled to body 1b in a foldable manner and gripped by a user when in use. In other words, grip 1a is folded when not in use. When in use, grip 1a is opened to form approximately T-shaped appearance or approximately L-shaped appearance as a whole.

Power cord 2 is connected to an end of grip 1a, which is distant from body 1b. Grip 1a is constituted by root part 1c and tip end part 1d. Root part 1c is formed integrally with body 1b. Root part 1c and tip end part 1d are pivotally connected to each other via connection part 1e. Tip end part 1d is pivoted about connection part 1e so as to be folded, so that hair dryer 1 can be made compact. A plurality of members are joined to form housing 3, thereby configuring an outer frame of hair dryer 1. Housing 3 accommodates several kinds of electric components.

Inside body 1b, an air blowing path is formed to extend from inlet opening 4a serving as one end in a longitudinal direction (horizontal direction in FIGS. 1 and 5) of body 1b to outlet opening 4b serving as the other end thereof. When fan 5, which is disposed in the air blowing path, is operated, air flow W1 occurs. Air flow W1 flows into the air blowing path from the outside through inlet opening 4a and passes through the air blowing path, and then reaches outlet opening 4b. After that, air flow W1 is discharged to the outside through outlet opening 4b. Inlet opening 4a and outlet opening 4b correspond to a suction port and a discharge port of hair dryer 1, respectively.

As shown in FIGS. 3 and 4, inlet opening 4a is covered with frame 81 having crosspiece 81a with a honeycomb shape. This structure makes it possible to form inlet opening 4a having a large opening area, while securing the strength of crosspiece 81a.

As shown in FIG. 5, mesh 82 is molded integrally with frame 81. Herein, an opening ratio of mesh 82 ranges from 55% to 90%, and each mesh width ranges from 300 μm to 650 μm. Mesh 82 is made of flame-resistant resin such as metal and polyester, for example. If fine mesh 82 is integrally molded in frame 81, dust, hair, or the like can be reliably prevented from entering the air flow path.

Inside outer tube 3a of housing 3, inner tube 6 is provided. Inner tube 6 has an approximately cylindrical shape, and air flow W1 flows therethrough. In an inner side of inner tube 6, fan 5 is disposed on the uppermost stream side of air flow W1. Motor 7 for driving fan 5 is disposed downstream of fan 5 in air flow W1. Heater 8, serving as a heater, is disposed downstream of motor 7 in air flow W1.

When heater 8 is operated, hot air is blown out from outlet opening 4b. In the present exemplary embodiment, a corrugated electric resistor having a belt-like shape is wound along an inner circumference of inner tube 6, so that heater 8 is configured. The present disclosure, however, is not limited to such a configuration.

At least one generator among a transition-metal-fine-particle generator, an ion generator, an acid component generator, and a charged-particle-liquid generator is disposed in housing 3. Herein, the transition-metal-fine-particle generator generates transition metal fine particles, the ion generator generates ions, the acid component generator generates acid components, and the charged-particle-liquid generator generates charged particle liquid.

For instance, the ion generator has a needle-shaped first electrode serving as a discharge electrode, and an annular-shaped second electrode serving as a counter electrode. When high voltage is applied between these electrodes, the ion generator generates ions.

For instance, the charged-particle-liquid generator has a needle-shaped first electrode serving as a discharge electrode, and an annular-shaped second electrode serving as a counter electrode. A liquid for generating charged particle liquid is supplied to the first electrode from a water supply device (not shown) such as a tank. When high voltage is applied between these electrodes, the charged-particle-liquid generator generates charged particle liquid.

To supply the liquid to the first electrode, there are two methods: one is to supply a liquid from the water supply device, and the other is to condense moisture into dew on a surface of the first electrode by cooling the first electrode, thereby supplying a liquid. This liquid is dew water containing moisture condensed on the surface of the first electrode, components dissolved from the first electrode, and components dissolved from a structural composition surrounding the first electrode.

The acid component generator is sufficient for making it possible to generate acid components. For instance, the acid component generator has a first electrode serving as a discharge electrode, and a second electrode serving as a counter electrode. When high voltage is applied between these electrodes, the acid component generator generates NOx-$(H_2O)$n or the like, which has acid components.

To generate acid components, the acid component generator may electrostatically atomize or volatilize a liquid having acid characteristics. The acid component generator may sublimate a solid to generate acid components.

As shown in FIGS. 4 through 7, in the present exemplary embodiment, metal-fine-particle generators 30 and 40, and mist generator 50 are disposed in cavity 9 (see FIG. 5) formed between housing 3 and inner tube 6.

Accordingly, the components generated by metal-fine-particle generators 30 and 40, and mist generator 50 may be discharged together with branch flow W2, or may be discharged from outlet opening 4b together with air flow W1. The generators are preferably disposed in a place not heated by heater 8. The generator, however, may be disposed in inner tube 6 in which heater 8 is installed.

Metal-fine-particle generators 30 and 40 generate transition metal fine particulates, ions, and acid components. Mist generator 50 generates charged particle liquid (nanoe; registered trademark), ions, and acid components.

In the present exemplary embodiment, metal-fine-particle generators 30 and 40 function as a transition-metal-fine-particle generator, an ion generator, and an acid component generator. Mist generator 50 functions as a charged-particle-liquid generator, an ion generator, and an acid component generator.

In the present exemplary embodiment, four kinds of generators are provided in housing 3. The four kinds of generators include a transition-metal-fine-particle generator that generates transition metal fine particulates, an ion generator that generates ions, an acid component generator that generates acid components, and a charged-particle-liquid generator that generates charged particle liquid. The ion generator and the acid component generator each are disposed in three places. The transition-metal-fine-particle generator and the charged-particle-liquid generator each are disposed in one place.

These four kinds of generators may be disposed such that each generator is independent from the others. It is not necessary to provide all of these four kinds of generators. In other words, only one kind of generators among these generators may be disposed in housing 3, or any two kinds of generators among these generators may be disposed in housing 3.

In the present exemplary embodiment, control part 10 controls generation amounts of ions, charged particle liquid, acid components, and transition metal fine particulates. Thus, suitable amounts of these components are supplied to hair, depending on hair condition. The hair condition includes hair quality, length, and a degree of dryness.

Voltage application circuit 12 for applying voltage to mist generator 50 or the like is disposed in cavity 9. A voltage application circuit (not shown) for applying voltage to metal-fine-particle generators 30 and 40 is also disposed in housing 3. To prevent a defect caused by mutual interference, the above-mentioned voltage application circuit is disposed in another place separate from a place where voltage application circuit 12 is disposed.

Voltage application circuit 12 and the above-mentioned voltage application circuit (not shown) for applying voltage to metal-fine-particle generators 30 and 40 are preferably disposed in an area on an extension of grip 1a within grip 1a or body 1b. This is because a rotation moment caused by weight of voltage application circuit 12 and the above-mentioned voltage application circuit (not shown) is reduced to decrease a load applied to a user's hand when the user holds grip 1a.

Voltage application circuit 12 and the above-mentioned voltage application circuit (not shown) are preferably disposed such that inner tube 6 is interposed therebetween. This makes it possible to prevent a voltage drop, instability, or the like caused by the mutual interference between voltage application circuit 12 and the above-mentioned voltage application circuit (not shown).

As shown in FIGS. 1, 2, 5, and 6, in the present exemplary embodiment, switch 21 for switching between hot air and cold air, changing an operation mode, and the like is disposed in a side portion of cavity 9. Specifically, switch 21 is disposed in another place separate from the place where voltage application circuit 12 is disposed in cavity 9.

In a cavity located at tip end part 1d of grip 1a, another switch 16 for switching between POWER ON and POWER OFF, or the like is disposed. These electric components are connected through leads 17, each being obtained by covering a core wire made of a metal conductor or the like with insulating resin or the like.

Lead 17 connected to metal-fine-particle generator 30, lead 17 connected to metal-fine-particle generator 40, and lead 17 connected to mist generator 50 are preferably routed so as to be as spaced from one another as possible, without intersecting with one another. This is because metal-fine-particle generators 30 and 40, and mist generator 50 are prevented from hardly obtaining desired voltage due to mutual interference between the currents flowing through leads 17, or the voltage is prevented from being unstable.

In the present exemplary embodiment, when operating element 18 disposed on a surface of housing 3 is operated, switch 16 switches an open/closed state of internal contacts. More specifically, by sliding operating element 18 in a vertical direction, i.e., a longitudinal direction of grip 1a, the open/closed state of internal contacts of switch 16 is switched in multi-stages.

When operating element 18 is operated, hair dryer 1 operates in any one of four modes, i.e., POWER OFF, weak air, middle air, and strong air, for example. For instance, when operating element 18 is moved to a bottom position, i.e., a position closest to tip end part 1d of grip 1a, hair dryer 1 is powered off.

When operating element 18 is slid up from the bottom position by one step, hair dryer 1 is powered on, and hair dryer 1 operates in a weak air mode. When operating element 18 is slid up from the bottom position by two steps, hair dryer 1 operates in a middle air mode. When operating element 18 is slid to a top position, hair dryer 1 operates in a strong air mode.

When operating elements 19, 19a, and 19b disposed on a side surface of housing 3 are pressed, switch 21 switches an open/closed state of internal contacts thereof. Switch 21 switches between hot air and cold air to select an operation mode. Display 14 (see FIGS. 1 through 3) disposed in an upper part of body 1b displays the selected operation mode.

Controller 10 is electrically connected to operating element 18, switch 21, and display 14. Controller 10 controls display 14, according to the operation applied to operating element 18 and switch 21.

In this example, when operating element 19 is operated, hair dryer 1 switches between hot air and cold air. An air temperature mode of hair dryer 1, however, may be switched to any one of four modes, i.e., "HOT", "HOT and COLD," "COLD," and "SCALP," at every time when operating element 19 is operated.

In this case, letters, a figure, and the like, which indicate the selected air temperature mode, are preferably displayed on display 14. Hereinafter, each air temperature mode and the indication displayed by display 14 will be exemplarily described.

"HOT" mode is a mode in which hot air is blown out. Specifically, in "HOT" mode, the air hitting hair in normal use has a temperature ranging from approximately 70° C. to 80° C. When "HOT" mode is selected, display 14 displays the letters of "HOT."

"Hot and Cold" mode is a mode in which hot air and cold air are blown out alternately. Specifically, in "Hot and Cold" mode, cold air is blown out for 5 seconds, and hot air is blown out for 7 seconds. After that, cold air is blown out again for 5 seconds, for example. When "Hot and Cold" mode is selected, display 14 displays the letters of "HOT" and the letters of "COLD" alternately, while displaying an arrow.

"COLD" mode is a mode in which cold air is blown out. Specifically, in "COLD" mode, the air hitting hair in normal use has a temperature of approximately 30° C. When "COLD" mode is selected, display 14 displays the letters of "COLD."

"SCALP" mode is a mode in which low temperature air is blown out in order to care a scalp. Specifically, in "SCALP" mode, the air hitting hair in normal use has a temperature of approximately 50° C. When "SCALP" mode is selected, display 14 displays the letters of "SCALP."

When operating element 18 is slid up and hair dryer 1 is powered on, controller 10 controls heater 8 such that heater 8 operates in the air temperature mode set at that point of time, and controls display 14 to display the air temperature mode at that point of time.

At the time when operating element 18 is slid up by one step to power on hair dryer 1, "HOT" mode is selected by using operating element 19. Thus, hair dryer 1 blows hot air.

At every time when operating element 19 is operated, controller 10 receives a signal corresponding to the operation and switches the air temperature mode in the following order, i.e., "Hot and cold" mode-→"COLD" mode-→"SCALP" mode-→"HOT" mode.

In the present exemplary embodiment, when "COLD" mode is selected in the weak air mode, display 14 displays the letters of "SKIN," while displaying the letters of "COLD."

When "COLD" is selected in the weak air mode, this mode can also be used as "SKIN" mode. "SKIN" mode is a mode selected in the case where skin care is performed, e.g., cold air containing mist or the like is blown to the skin to make a moisture state of skin suitable.

In the present exemplary embodiment, hair dryer 1 includes detector 60 that detects environmental temperature. The environmental temperature is temperature of a place where hair dryer 1 is used. Controller 10 controls an amount of power to be supplied to heater 8, according to the environmental temperature detected by detector 60.

Detector 60 is a hot air sensor provided on a downstream side of fan 5 serving as a blower, which is disposed in hair dryer 1. Detector 60 is provided in a place where not being affected by heat of heater 8. In the present exemplary embodiment, as shown in FIGS. 5 and 6, detector 60 is disposed on a downstream side of gap g1 that is located outside inner tube 6 in cavity 9.

For instance, when the environmental temperature is 10° C., controller 10 causes a larger current to flow into heater 8, and generates hot air having a temperature ranging from 110° C. to 130° C., preferably hot air having a temperature of 120° C., for example. When the environmental temperature is 30° C., controller 10 decreases an amount of power to be supplied to heater 8, and generates hot air having a temperature ranging from 50° C. to 70° C., preferably hot air having a temperature of 60° C., for example.

In the present exemplary embodiment, operating element 19a can be operated to change a hair quality mode. Specifically, operating element 19a can switch between a thick hair mode for thick hair and a thin hair mode for thine hair.

In the present exemplary embodiment, the generator provided in housing 3 adjusts an amount of components to be generated according to the selected hair quality mode.

In the present exemplary embodiment, operating element 19b can be operated to change a hair length mode. Specifically, operating element 19b can switch between a short hair mode for short hair, a long hair mode for long hair, and a medium hair mode for medium length hair.

In the present exemplary embodiment, the generator provided in housing 3 adjusts an amount of components to be generated according to the selected hair length mode.

Display 14 displays the hair quality mode and the hair length mode, which have been selected, such that the selected modes can be understood. For instance, when a long hair mode is selected, display 14 displays at least one of letters or a picture indicating the long hair mode.

In hair dryer 1 of the present exemplary embodiment, controller 10 controls a generator, which is provided in housing 3, such that its generation amount of components will be decreased as compared with the generation amount at the time of start of use, if the generator is used during a certain period of time.

Each hair length mode has different time until a rate of a generation amount after a predetermined period elapses to a generation amount at the time of start of use reaches a predetermined value.

Accordingly, when displaying the selected hair length mode, display 14 may display the time required for decreasing a generation amount in the selected mode.

In hair dryer 1 of the present exemplary embodiment, the amount of components to be generated at the time of start of use is different for every hair quality mode. In other words, controller 10 performs either one of a first control mode in which a generation amount is larger or a second control mode in which a generation amount is smaller.

Therefore, when displaying the selected hair quality mode, display 14 may display the amount of components to be generated at the time of start of use in the selected mode.

Display 14 displays various kinds of information, in addition to the selected hair quality mode and the selected hair length mode.

For instance, display 14 displays a generation amount of each component in the ion generator, the charged-particle-liquid generator, the acid component generator, and the transition-metal-fine-particle generator. In display 14, changes in amounts of ions, charged particle liquid, acid components, and transition metal fine particles are displayed using a change in a lighting state of LED (light emitting diode).

Display 14 may display whether the first control mode in which a generation amount is larger or the second control mode in which a generation amount is smaller is performed. For instance, display 14 may display whether the generator is driven in the first control mode or the second control mode, as a hair care effect such as hair volume-down or hair volume-up.

As shown in FIGS. 3, 4, and 6, display 14 includes a chip-type light emitting diode 11 mounted on a control board, diffusion board 13 with a white or milk white color for diffusing light of light emitting diode 11, and display panel 15 made of transparent resin.

Display panel 15 may be formed separately from housing 3, and fixed to housing 3 with a double-sided adhesive tape, or may be formed integrally with housing 3. A half mirror layer for reflecting external light is preferably provided on the back of display panel 15 by printing or transfer.

A shielding layer for selectively shielding the light from light emitting diode 11 is preferably provided on a face of the half mirror layer facing light emitting diode 11 by printing or coating.

The term of "selectively shielding" means shielding an area except for letters, for example, so as to display air temperature indication and the letters or patterns of "HOT," "Hot and Cold," "COLD," "SCALP," "SKIN," and the like.

With such a configuration, light emitting diode 11 emits no light in the state of power-off, so that the inside of hair dryer 1 is dark. Even if the outside of hair dryer 1 is bright, it is difficult to see internal components, the letters, or the like, because external light is reflected on the half mirror layer.

When a power supply of hair dryer 1 is turned on, light emitting diode 11 emits light. The light passes through the shielding layer and the half mirror layer, and is emitted to the outside. At this time, the area except for letters is shielded by the shielding layer. Thus, the letters appear on display 14.

Light emitting diode 11 may emit different color light, depending on the letters or patterns to be displayed. Light emitting diode 11, however, may emit the same color light, not depending on the letters or patterns to be displayed.

A printing color of display 14 may be changed, depending on the color of body 1b. However, if the printing color of display 14 is white, pink, gold, or the like, it will be difficult to shield the area sufficiently by using monochrome printing. For this reason, after being printed with appearance printing color, display 14 is recommended to be printed with silver-based printing color in which an ink material having a high blending rate of metallic powder is used as a shielding material.

As shown in FIGS. 5 and 6, inner tube 6 has cylindrical part 6a and a plurality of support ribs 6b. The plurality of support ribs 6b radially extends from cylindrical part 6a. Each of the plurality of support ribs 6b extends radially from cylindrical part 6a. Note that, only one support rib 6b is illustrated in FIG. 6, among the plurality of support ribs 6b. Inner tube 6 has flange 6c. Flange 6c is connected to cylindrical part 6a via support rib 6b, and protruded almost perpendicularly to an axis of cylindrical part 6a.

Gap g1 is formed between cylindrical part 6a and flange 6c. A part of air flow W1 is branched, and flows into cavity 9 through gap g1. Thus, branch flow W2 is formed. Gap g1 is provided downstream of fan 5 and upstream of heater 8, and functions as a feed port of branch flow W2 to cavity 9. Accordingly, branch flow W2 is an air flow including a relatively cold air before being heated by heater 8.

A part of branch flow W2 is further branched, and forms branch flow W3. Branch flow W3 does not pass through metal-fine-particle outlets 20a and 20b, and mist outlet 20c, described later (see FIG. 2). Branch flow W3 is an air flow including a relatively cold air that passes through between inner tube 6 and housing 3 and blows out from a peripheral portion of outlet opening 4b.

Through hole 3b (see FIG. 2) with an approximately arc shape is formed on an outlet opening 4b side of cavity 9 in housing 3. Through hole 3b is closed by cover 20 (see FIG. 2) made of an insulating synthetic resin material.

In the present exemplary embodiment, cover 20 is attached to housing 3 so as to cover through hole 3b formed in housing 3. If cover 20 is moved from left to right in FIG. 5 with respect to housing 3, cover 20 will be attached to housing 3.

Metal-fine-particle outlets 20a and 20b, and mist outlet 20c each are formed in cover 20, independently.

As shown in FIGS. 2, 4, and 7, ion channel 4c through which ions flow is formed in front of mist generator 50 and metal-fine-particle generators 30 and 40. Therefore, metal-fine-particle outlets 20a and 20b, and mist outlet 20c are provided on a downstream side of ion channel 4c. Mist generator 50 and metal-fine-particle generators 30 and 40 function as an ion generator.

To prevent electrification caused by metal fine particles or mist, the conductivity of cover 20 is preferably lower than that of housing 3. This is because, if cover 20 is charged, the electric charges will prevent metal-fine-particle generators 30 and 40, and mist generator 50 from emitting electrically charged metal fine particulates, negative ions, and mist.

To prevent the electrification of cover 20, cover 20 is preferably formed using a hardly charged material such as polycarbonate resin, for example. As for this portion, cover 20 constitutes the outer frame of hair dryer 1.

In the present exemplary embodiment, metal-fine-particle outlets 20a and 20b each have a hole diameter smaller than that of mist outlet 20c. Thus, mist generator 50 can be checked and repaired through mist outlet 20c, easily. Besides, a finger or the like can be prevented from entering the inside from metal-fine-particle outlets 20a and 20b, accidentally.

On an inner side of cover 20, a rib is preferably provided. The rib is brought into contact with counter electrode 52 (second electrode) of mist generator 50 described later, thereby removing the electric charges on cover 20.

As shown in FIG. 4, in the present exemplary embodiment, three ion generation devices 100 are constituted by cover 20 and mist generator 50, cover 20 and metal-fine-particle generator 30, and cover 20 and metal-fine-particle generator 40.

As shown in FIGS. 1 and 5, in the present exemplary embodiment, charging part 1f serving as an electrified panel, which can change a charging state of hair, is provided in an outer surface of grip 1a. Charging part 1f is formed of conductive resin.

As shown in FIG. 2, in the present exemplary embodiment, metal-fine-particle outlets 20a and 20b are formed around mist outlet 20c. Specifically, metal-fine-particle outlets 20a and 20b are arranged such that mist outlet 20c is interposed therebetween.

With this arrangement, negatively charged mist can be prevented from spreading outwardly by the negative ions blown out from metal-fine-particle outlets 20a and 20b. This makes it possible to blow the mist on hair straightly. As a result, hair care effect can be improved.

As shown in FIGS. 4, 6, and 7, metal-fine-particle generator 30, mist generator 50, and metal-fine-particle generator 40 are arranged side by side in this order in a width direction (horizontal direction in FIG. 4) of hair dryer 1 within cavity 9.

Shield plate 6d is formed between mist generator 50 and metal-fine-particle generator 30. Shield plate 6d is also formed between mist generator 50 and metal-fine-particle generator 40. Shield plate 6d extends in a vertical direction and a longitudinal direction of body 1b. Thus, metal fine particles and mist are prevented from being mixed before being blown out from metal-fine-particle outlets 20a and 20b and mist outlet 20c.

Metal-fine-particle generators 30 and 40 have discharge electrodes 31 and 41 (see FIG. 2) and counter electrodes 32 and 42 (see FIG. 4), respectively, each being formed of a conductive metal material.

In the present exemplary embodiment, when a high voltage ranging from −1 kV to −3 kV is applied between discharge electrode 31 and counter electrode 32, and between discharge electrode 41 and counter electrode 42 by a voltage application circuit (not shown), a discharge such as a corona discharge occurs.

Metal-fine-particle generator 30 emits metal fine particles, such as metal molecules and negative ions, from discharge electrode 31 and counter electrode 32 by discharging. Metalfine-particle generator 40 also emits metal fine particles, such as metal molecules and negative ions, from discharge electrode 41 and counter electrode 42 by discharging. Metal-fine-particle generators 30 and 40 may have the same shape, or may have a different shape.

Discharge electrodes 31 and 41 are constituted by a simple substance of transition metal, an alloy containing transition metal, or a member plated with transition metal. The transition metal includes gold, silver, copper, platinum, zinc, titanium, rhodium, palladium, iridium, ruthenium, and osmium. If fine metal particles emitted from metal-fine-particle generators 30 and 40 contain gold, silver, copper, zinc, or the like, the fine metal particles will have antibacterial action.

If containing platinum, zinc, titanium, or the like, the fine metal particles will have antioxidant action. Platinum fine particles have extremely high antioxidant action.

In the present exemplary embodiment, both discharge electrode 31 of metal-fine-particle generator 30 and discharge electrode 41 of metal-fine-particle generator 40 contain zinc. Discharge electrode 31 and discharge electrode 41, however, may contain different metal.

Metal-fine-particle generators 30 and 40 generate negative ions, such as $NO_2-$ and $NO_3-$, by discharging.

If these ions are subjected to collision with discharge electrodes 31 and 41, counter electrodes 32 and 42, other metal materials, members containing other metal components, and the like, metal fine particles can also be generated. In other words, to emit the metal fine particles, counter electrodes 32 and 42, and the above-mentioned other members may be constituted by a material containing the above-mentioned transition metal. Metal-fine-particle generators 30 and 40 also generate acid components by discharging.

Mist generator 50 has discharge electrode 51 (first electrode) and counter electrode 52 (second electrode), which are formed of a conductive metal material. When a high voltage ranging from −3 kV to −5 kV is applied between discharge electrode 51 and counter electrode 52 by voltage application circuit 12, a discharge such as a corona discharge occurs in mist generator 50.

Figure 8A:
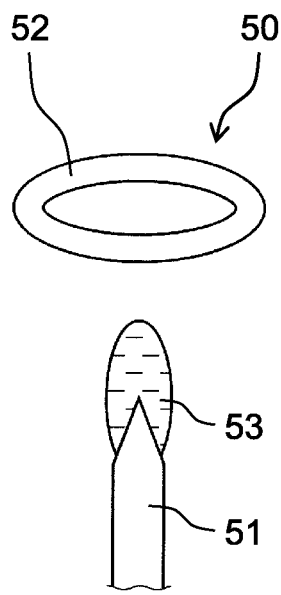
FIG. 8A is a view schematically showing a discharge electrode and a counter electrode of a mist generator.
Figure 8B:
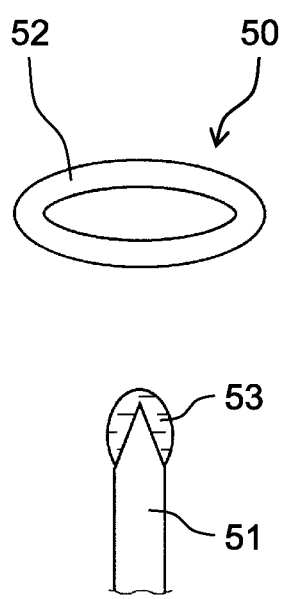
FIG. 8B is a view schematically showing the discharge electrode and the counter electrode of the mist generator.

FIGS. 8A and 8B schematically show discharge electrodes and counter electrodes of mist generator 50. FIG. 8A shows a tailor-corn shaped electrode when a relatively large amount of moisture is supplied to the discharge electrode. FIG. 8 B shows a tailor-corn shaped electrode when a relatively small amount of moisture is supplied to the discharge electrode.

In the present exemplary embodiment, as shown in FIGS. 8A and 8B, discharge electrode 51 has a needle shape. Counter electrode 52 has an annular shape. Counter electrode 52 is disposed near a tip end of discharge electrode 51, and spaced from discharge electrode 51.

Mist generator 50 has a water supply device (not shown) that supplies moisture 53 to discharge electrode 51.

Mist generator 50 atomizes moisture 53, which has been supplied, by discharging, and generates very fine mist of a nano meter size. This mist is negatively charged particle liquid including negative ions. Mist generator 50 also generates ions and acid components by discharging.

As shown in FIG. 8A, when a relatively large amount of moisture 53 is supplied to discharge electrode 51, mist generator 50 decreases a generation amount of charged particle liquid (nanoe), while increasing a generation amount of ions. As shown in FIG. 8B, when a relatively small amount of moisture 53 is supplied to discharge electrode 51, mist generator 50 increases a generation amount of charged particle liquid (nanoe), while decreasing a generation amount of ions.

As shown in FIG. 6, metal-fine-particle generators 30 and 40, and mist generator 50 are fixed to fixing member 6g disposed on upper wall 6f of inner tube 6 to be disposed above inner tube 6.

Depending on a shape and a position of fixing member 6g, a direction and a volume of air that flows through cavity 9, which serves as a branch channel, can be adjusted. In other words, fixing member 6g can be used as control means for controlling a direction and a volume of the air that flows through cavity 9.

In the present exemplary embodiment, counter electrode 52 (second electrode) is disposed closer to mist outlet 20c than discharge electrode 51 (first electrode) is.

Figure 9:
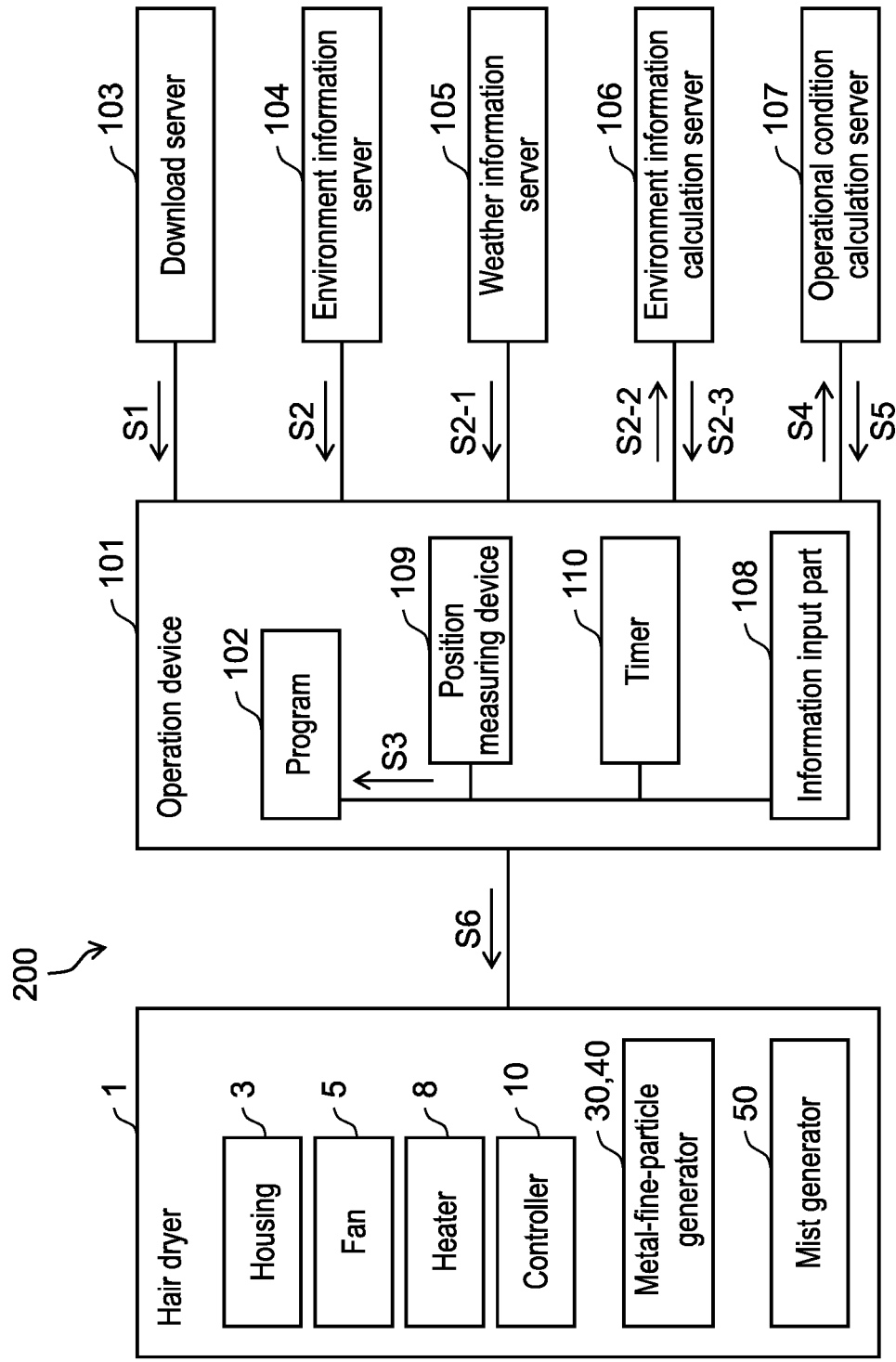
FIG. 9 is a block diagram showing a configuration of the heat blower system in accordance with the present exemplary embodiment.

Next, heat blower system 200 including hair dryer 1 will be described with reference to FIGS. 9 through 13. FIG. 9 is a block diagram showing a configuration of heat blower system 200 in accordance with the present exemplary embodiment.

As shown in FIG. 9, heat blower system 200 includes hair dryer 1 mentioned above, and operation device 101. Operation device 101 includes program 102 that controls heat blower system 200. Heat blower system 200 further includes download server 103, environment information server 104, weather information server 105, environment information calculation server 106, and operational condition calculation server 107.

Environment information server 104, weather information server 105, environment information calculation server 106, and operational condition calculation server 107 may be connected through LAN (Local Area Network), or may be connected through WAN (Wide Area Network). Environment information server 104, weather information server 105, environment information calculation server 106, and operational condition calculation server 107 may be application software installable in operation device 101 such as a smart phone.

Hair dryer 1 has housing 3, fan 5, heater 8, and controller 10 that controls fan 5, heater 8, and the like.

Program 102 is downloaded from download server 103 and installed in operation device 101 such as a smart phone (see arrow S1 in FIG. 9). Operation device 101 has program 102, information input part 108, position measuring device 109, and timer 110. Position measuring device 109 is a GPS (Global Positioning System). Operation device 101 operates as follows, according to program 102.

Program 102 may be downloaded from download server 103 and installed in operation device 101, or may be installed in operation device 101 in advance.

Using information input part 108, a user selects any one of finishing information such as "moist," "smooth," and "damage control/restoration," and inputs it. According to program 102, operation device 101 determines a basic operation of hair dryer 1, and each of generation amounts of ions, charged particle liquid, acid components, and transition metal fine particles, based on the inputted finishing information.

Operation device 101 provides the information to controller 10 of hair dryer 1. According to the information, controller 10 controls fan 5, heater 8, metal-fine-particle generators 30 and 40, and mist generator 50.

FIG. 10 exemplarily shows operational conditions of hair dryer 1, depending on finishing information. As shown in FIG. 10, if the inputted finishing information is "moist," controller 10 will set air volume to be less than or equal to 1.0 m³/min, set air temperature to be in a range from 60° C. to 80° C., set an amount of ions to "small," set an amount of charged particle liquid to "large," set an amount of acid components to "medium," and set an amount of transition metal fine particles to "medium."

If the inputted finishing information is "smooth," controller 10 will set air volume to be more than or equal to 1.0 m³/min, set air temperature to be in a range from 80° C. to 120° C., set an amount of ions to "large," set an amount of charged particle liquid to "small," set an amount of acid components to "medium," and set an amount of transition metal fine particles to "medium."

If the inputted finishing information is "damage control/restoration," controller 10 will set air volume to be more than or equal to 0.7 m³/min, set air temperature to be less than or equal to 100° C., set an amount of ions to "medium," set an amount of charged particle liquid to "medium," set an amount of acid components to "large," and set an amount of transition metal fine particles to "large."

Operation device 101 obtains at least one of outdoor environment information, such as an outdoor temperature, an outdoor humidity, a day length, and an ultraviolet ray intensity, from environment information server 104 (see arrow S2 in FIG. 9).

Operation device 101 obtains at least two of local information, time information, and weather information. In the present exemplary embodiment, operation device 101 obtains local information about a place where hair dryer 1 is used from position measuring device 109. Operation device 101 obtains time information about the time when hair dryer 1 is used from timer 110. Further, operation device 101 obtains weather information from weather information server 105 (see arrow S2-1 in FIG. 9).

Operation device 101 provides the local information, the time information, and the weather information, which have been obtained, to environment information calculation server 106 (see arrow S2-2 in FIG. 9). Environment information calculation server 106 determines outdoor environment information, based on the provided information (see arrow S2-3 in FIG. 9).

Operation device 101 obtains information such as hair quality, hair volume, and finishing information. The information is inputted by a user through information input part 108 (see arrow S3 in FIG. 9).

Operation device 101 provides the obtained outdoor environment information, such as the outdoor temperature, the outdoor humidity, the day length, and the ultraviolet ray intensity, to operational condition calculation server 107 (see arrow S4 in FIG. 9). Operational condition calculation server 107 determines at least one of generation amounts of ions, charged particle liquid, acid components, and transition metal fine particles, while determining at least one operational condition of air volume, air temperature, or the like of hair dryer 1.

Operation device 101 obtains at least one generation amount among generation amounts of ions, charged particle liquid, acid components, and transition metal fine particles, while obtaining at least one operational condition among air volume, air temperature, and the like of hair dryer 1 (see arrow S5 in FIG. 9).

Operation device 101 provides the obtained information to controller 10 of hair dryer 1 (see arrow S6 in FIG. 9). According to the provided information, controller 10 controls fan 5, heater 8, metal-fine-particle generators 30 and 40, and mist generator 50.

FIG. 11 exemplarily shows the operational conditions of hair dryer 1, depending on environment information such as the outdoor temperature and the outdoor humidity. In FIG. 11, "large" and "high" mean "increase" or "rise" in the operational condition, and "small" and "low" means "decrease" or "fall" in the operational condition.

As shown in FIG. 11, when the outdoor temperature is "high," controller 10 sets air volume to "large," and sets air temperature to "low." When the outdoor temperature is "low," controller 10 sets air volume to "small," and sets air temperature to "high."

When the outdoor humidity is "high", controller 10 sets an amount of ions to "large", and sets an amount of charged particle liquid to "small." When the outdoor humidity is "low," controller 10 sets an amount of ions to "small," and sets an amount of charged particle liquid to "large."

When the day length is "long," controller 10 sets an amount of acid components to "large," and sets an amount of transition metal fine particles to "large." When the day length is "short," controller 10 sets an amount of acid components to "small," and sets an amount of transition metal fine particles to "small."

When the ultraviolet ray intensity is "strong," controller 10 sets an amount of acid components to "large," and sets an amount of transition metal fine particles to "large." When the ultraviolet ray intensity is "weak," controller 10 sets an amount of acid components to "small," and sets an amount of transition metal fine particles to "small."

FIG. 12 exemplarily shows the operational conditions of hair dryer 1, depending on environment information such as a season. In FIG. 12, "large" and "high" mean "increase" or "rise" in the operational condition, and "small" and "low" mean "decrease" or "fall" in the operational condition.

As shown in FIG. 12, when a season is "spring or autumn," controller 10 sets air volume to "large," sets air temperature to "high," sets an amount of ions to "small," sets an amount of charged particle liquid to "large," sets an amount of acid components to "large," and sets an amount of transition metal fine particles to "large."

When a season is "rainy season," controller 10 sets air volume to "large," sets air temperature to "low," sets an amount of ions to "large," sets an amount of charged particle liquid to "small," sets an amount of acid components to "small," and sets an amount of transition metal fine particles to "small."

When a season is "summer," controller 10 sets air volume to "large," sets air temperature to "low," sets an amount of ions to "large," sets an amount of charged particle liquid to "small," sets an amount of acid components to "small," and sets an amount of transition metal fine particles to "large."

When a season is "winter," controller 10 sets air volume to "small," sets air temperature to "high," sets an amount of ions to "small," sets an amount of charged particle liquid to "large," sets an amount of acid components to "large," and sets an amount of transition metal fine particles to "small."

When weather is "fine," controller 10 sets air volume to "large," sets air temperature to "low," sets an amount of ions to "large," sets an amount of charged particle liquid to "small," sets an amount of acid components to "small," and sets an amount of transition metal fine particles to "large."

When weather is "rain," controller 10 sets air volume to "large," sets air temperature to "low," sets an amount of ions to "large," sets an amount of charged particle liquid to "small," sets an amount of acid components to "small," and sets an amount of transition metal fine particles to "small."

FIG. 13 exemplarily shows the operational conditions of hair dryer 1, depending on user information. In FIG. 13, "large" and "high" mean "increase" or "rise" in the operational condition, and "small" and "low" mean "decrease" or "fall" in the operational condition.

As shown in FIG. 13, when "length or volume" related to user's hair quality is long or rich, controller 10 sets air volume to "large," sets air temperature to "high," sets an amount of ions to "large," sets an amount of charged particle liquid to "large," sets an amount of acid components to "large," and sets an amount of transition metal fine particles to "large."

When "curl" related to user's hair quality is strong, controller 10 sets air volume to "small," sets air temperature to "high," sets an amount of ions to "large," sets an amount of charged particle liquid to "small," sets an amount of acid components to "large," and sets an amount of transition metal fine particles to "small."

When "damage" related to user's hair quality is strong, controller 10 sets air volume to "small," sets air temperature to "low," sets an amount of ions to "small," sets an amount of charged particle liquid to "large," sets an amount of acid components to "large," and sets an amount of transition metal fine particles to "large."

When a user desires to "moisturize hair," controller 10 sets air volume to "large," sets air temperature to "low," sets an amount of ions to "large," sets an amount of charged particle liquid to "small," sets an amount of acid components to "small," and sets an amount of transition metal fine particles to "large."

When a user desires to "smoothen hair," controller 10 sets air volume to "large," sets air temperature to "low," sets an amount of ions to "large," sets an amount of charged particle liquid to "small," sets an amount of acid components to "small," and sets an amount of transition metal fine particles to "small."

When a user desires to "straighten curly hair," controller 10 stets air volume to "small," sets air temperature to "high," sets an amount of ions to "large," sets an amount of charged particle liquid to "small," sets an amount of acid components to "large," and sets an amount of transition metal fine particles to "small."

When a user desires to "care damaged hair," controller 10 stets air volume to "small," sets air temperature to be "low," sets an amount of ions to "small," sets an amount of charged particle liquid to "large," sets an amount of acid components to "large," and sets an amount of transition metal fine particles to "large."

Hereinafter, operational advantage by the present exemplary embodiment will be described.

(1) Heat blower system 200 includes hair dryer 1 serving as a heat blower that has fan 5 and heater 8 serving as a heater, which are disposed in housing 3, and program 102 that controls hair dryer 1.

Program 102 has a step of obtaining at least one outdoor environment information among the outdoor temperature, the outdoor humidity, the outdoor wind speed, the day length, and the ultraviolet ray intensity. Program 102 further has a step of determining at least one operational condition of an air volume or an air temperature of hair dryer 1, based on the obtained outdoor environment information.

This makes it possible to control hair dryer 1 in consideration of outdoor environmental conditions.

(2) Program 102 has a step of obtaining local information, a step of obtaining time information, a step of obtaining weather information, and a step of determining outdoor environment information from at least two of the local information, the time information, and the weather information, which have been obtained.

With this configuration, outdoor environment information can be obtained easily, without measuring actual outdoor temperature, actual outdoor humidity, and the like.

(3) Program 102 is executed in operation device 101 serving as a different device from hair dryer 1.

With this configuration, input and operation components can be omitted in hair dryer 1. As a result, enlargement of hair dryer 1 can be avoided.

(4) Heat blower system 200 includes hair dryer 1 serving as a heat blower that has fan 5 and heater 8 serving as a heater, which are disposed in housing 3. Heat blower system 200 includes environment information server 104 serving as an information server that has at least one outdoor environment information among the outdoor temperature, the outdoor humidity, the outdoor wind speed, the day length, and the ultraviolet ray intensity.

Heat blower system 200 includes operational condition calculation server 107 serving as a calculation server that determines at least one operational condition of an air volume or an air temperature of hair dryer 1, based on at least one outdoor environment information. Heat blower system 200 includes program 102 that controls hair dryer 1.

Program 102 has a step of obtaining at least one outdoor environment information from environment information server 104, and a step of providing the obtained outdoor environment information to operational condition calculation server 107. Program 102 further has a step of obtaining at least one operational condition from operational condition calculation server 107.

With this configuration, hair dryer 1 can be controlled in consideration of outdoor environmental conditions.

(5) Heat blower system 200 includes: hair dryer 1 serving as a heat blower that has fan 5 and heater 8 serving as a heater, which are disposed in housing 3; and position measuring device 109 that obtains local information about a place where hair dryer 1 is used.

Heat blower system 200 includes timer 110 that has time information, and weather information server 105 serving as an information server that has weather information. Heat blower system 200 includes: environment information calculation server 106 serving as a calculation server that determines outdoor environment information from the local information, the time information, and the weather information; and program 102 that controls hair dryer 1.

Program 102 has a step of obtaining local information about a place where hair dryer 1 is used from position measuring device 109, and a step of obtaining time information about the time when hair dryer 1 is used from timer 110. Program 102 has a step of obtaining weather information from weather information server 105.

Program 102 has: a step of providing the local information, the time information, and the weather information, which have been obtained, to environment information calculation server 106; and a step of obtaining outdoor environment information from environment information calculation server 106. Program 102 has: a step of providing the obtained outdoor environment information to operational condition calculation server 107; and a step of obtaining at least one operational condition from operational condition calculation server 107.

With this configuration, hair dryer 1 can be controlled in consideration of outdoor environmental conditions.

(6) Hair dryer 1 has at least one generator among a transition-metal-fine-particle generator, an ion generator, an acid component generator, and a charged-particle-liquid generator. Program 102 has a step of obtaining an operational condition of the at least one generator among the transition-metal-fine-particle generator, the ion generator, the acid component generator, and the charged-particle-liquid generator of hair dryer 1, based on obtained outdoor environment information.

This configuration makes it possible to control the operational conditions such as an amount of transition metal fine particles, an amount of ions, an amount of acid components, and an amount of charged particle liquid, in consideration of outdoor environmental conditions.

(7) Hair dryer 1 has an ion generator, a charged-particle-liquid generator, and controller 10 that controls the ion generator and the charged-particle-liquid generator to adjust a generation amount of ions and a generation amount of charged particle liquid. Controller 10 decreases the generation amount of charged particle liquid while increasing the generation amount of ions, or increases the generation amount of charged particle liquid while decreasing the generation amount of ions.

With this configuration, a generation amount of ions and a generation amount of charged particle liquid can be adjusted to moisturize or smoothen hair. Specifically, a supply of moisture to hair by charged particle liquid is increased, and electrical neutralization of hair by ions is prevented, thereby making it possible to promote the supply of moisture to hair. As a result, hair can be moisturized.

On the other hand, the supply of moisture to hair by charged particle liquid is decreased, and the electrical neutralization of hair by ions is promoted, thereby making it possible to prevent the supply of moisture to hair. As a result, hair can be smoothened.

(8) A charged-particle-liquid generator has discharge electrode 51 and a water supply device. Controller 10 controls an amount of water to be supplied to discharge electrode 51 from the water supply device, thereby adjusting a generation amount of ions and a generation amount of charged particle liquid.

With this configuration, controller 10 needs to control only a charged-particle-liquid generator in order to adjust a generation amount of ions and a generation amount of charged particle liquid. As a result, the sequence control can be simplified.

(9) Mist generator 50 functions as an ion generator and a charged-particle-liquid generator. In other words, the charged-particle-liquid generator and the ion generator are the same. This configuration makes it possible to reduce the number of components of hair dryer 1, so that hair dryer 1 can be miniaturized.

Figure 14:
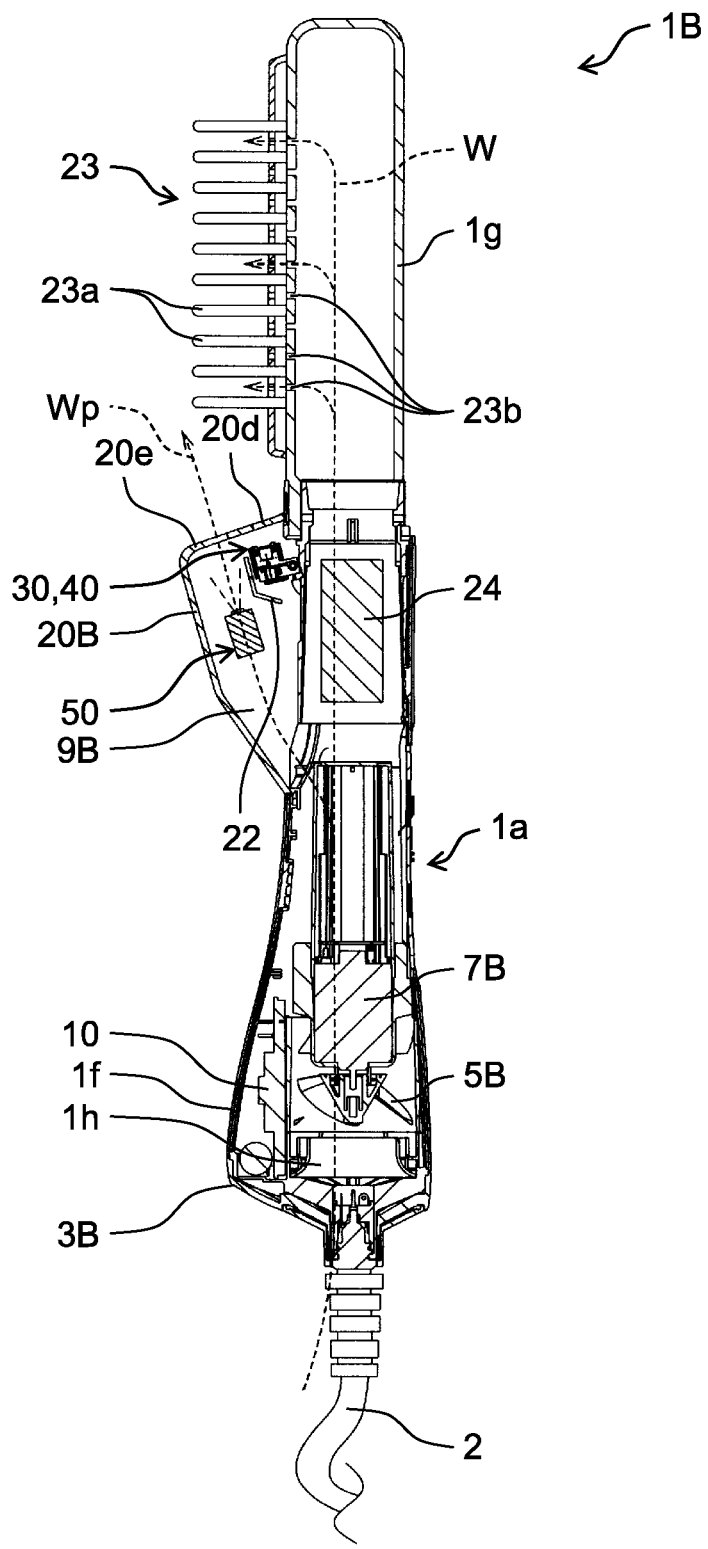
FIG. 14 is a cross-sectional view of a heat blower in accordance with a modification of the present exemplary embodiment.

The present disclosure can be modified variously, without being limited to the above-mentioned exemplary embodiment. FIG. 14 is a cross-sectional view of hair dryer 1B with a brush in accordance with a modification of the present exemplary embodiment.

As shown in FIG. 14, hair dryer 1B with a brush is a device having a cylindrical shape of which grip 1a is held to comb one's hair, using brush section 23 provided at tip end part 1g thereof. A plurality of bristles 23a are provided on brush section 23.

Housing 3B is formed by joining a plurality of members to constitute an outer frame of hair dryer 1B with a brush. Cover 20B, which constitutes a bulge-shaped outer frame, is attached to an area close to brush section 23 of grip 1a. Metal-fine-particle generators 30 and 40, and mist generator 50 are accommodated in air blowing path 9B formed between cover 20B and housing 3B.

Outlets 20d and 20e, which are opened toward bristle 23a, are formed in cover 20B. Metal fine particles generated by metal-fine-particle generators 30 and 40, and mist generated by mist generator 50 are emitted to the outside from outlets 20d and 20e, and act on hair or skin. Circuit 24 applies voltage to metal-fine-particle generators 30 and 40, and mist generator 50.

Fan 5B and motor 7B are provided in air blowing path 9B formed in housing 3B. Motor 7B is driven by a drive circuit included in circuit 24. When motor 7B rotates fan 5B, air flow W and branch flow Wp are generated. Metal fine particles generated by metal-fine-particle generators 30 and 40, and mist generated by mist generator 50 are emitted by branch flow Wp through outlets 20d and 20e.

Opening 1h is formed on a grip 1a side of housing 3B. When fan 5B is rotated, air flows into air blowing path 9B from the outside through opening 1h to form air flow W directed to brush section 23 from air blowing path 9B. Air flow W is blown out from outlet 23b formed in a root of bristle 23a of brush section 23.

If a user is electrified, the user may prevent emission of metal fine particles. To avoid that situation, charging part 1f serving as an electrified panel is provided in a surface of grip 1a.

Shield wall 22 is provided so as to cover metal-fine-particle generators 30 and 40. The mist, which is generated by mist generator 50, is prevented from reaching metal-fine-particle generators 30 and 40 by shield wall 22.

According to hair dryer 1B with a brush in accordance with the present modification, the same operation and advantage as in the above-mentioned exemplary embodiment are achieved.

In the present exemplary embodiment, a metal-fine-particle generator, which generates metal fine particles and negative ions, is provided as an ion generator. However, a generator that generates only negative ions without generating metal fine particles may be employed.

The present disclosure is also applicable to an ion generation device generating positive ions. Such an ion generation device will be useful, if the generation device is used for the hair in the case of wearing artificial hair such as a wig. This is because artificial hair is easy to be charged negatively, and positive ions, which are applied thereon, can prevent occurrence of static electricity.

In the present exemplary embodiment, a mist generator and a negative ion generator each have a counter electrode (second electrode) facing a discharge electrode (first electrode). However, the counter electrode (second electrode) may be provided so as not to face the discharge electrode (first electrode).

In the present exemplary embodiment, two fine-metal-particle outlets are formed. However, three or more fine-metal-particle outlets may be formed.

In the present exemplary embodiment, metal fine particles and mist are blown out by a branch flow. However, even if there is no branch flow, the metal fine particles and the mist can be blown out.

A hair care agent, which imparts hair care effect to hair, can be used. When hair is relatively dry, the emission amount thereof is decreased to improve the hair care effect. Such a hair care agent includes an agent containing oil components, for example. The hair care agent containing oil components may improve hair care effect, because of a little adhesion to hair surface.

What is claimed is:

1. A control method of a heat blower system including a heat blower, the heat blower comprising a fan and a heater that are disposed in a housing, the control method of the heat blower system comprising steps of:

obtaining at least one outdoor environment information selected from the group consisting of an outdoor temperature, an outdoor humidity, an outdoor wind speed, a day length, and an ultraviolet ray intensity; and determining at least one operational condition of an air volume or an air temperature of the heat blower, based on the obtained outdoor environment information, wherein:

the heat blower comprises at least one of a transition-metal-fine-particle generator, an ion generator, an acid component generator, or a charged-particle-liquid generator, and the control method of the heat blower system further comprises obtaining an operational condition of at least one generator selected from the group consisting of the transition-metal-fine-particle generator, the ion generator, the acid component generator, and the charged-particle-liquid generator of the heat blower, based on the obtained outdoor environment information; wherein the heat blower is a hair dryer.

2. The control method of the heat blower system according to claim 1, further comprising steps of:
obtaining local information;
obtaining time information;
obtaining weather information; and
determining the outdoor environment information from at least two of the obtained local information, the obtained time information, or the obtained weather information.

3. The control method of the heat blower system according to claim 1, wherein:
the heat blower comprises the ion generator, the charged-particle-liquid generator, and a controller that controls the ion generator and the charged-particle-liquid generator to adjust a generation amount of ions and a generation amount of charged particle liquid, and
the controller decreases the generation amount of charged particle liquid while increasing the generation amount of ions, or increases the generation amount of charged particle liquid while decreasing the generation amount of ions.

4. The control method of the heat blower system according to claim 3, wherein:
the charged-particle-liquid generator comprises a discharge electrode and a water supply device, and
the controller controls an amount of water supplied to the discharge electrode from the water supply device to adjust the generation amount of ions and the generation amount of charged particle liquid.

5. The control method of the heat blower system according to claim 3, wherein
the ion generator and the charged-particle-liquid generator are the same.

6. A control method of a heat blower system, the blower system including:
a heat blower comprising a fan and a heater that are disposed in a housing;
an information server comprising at least one outdoor environment information among an outdoor temperature, an outdoor humidity, an outdoor wind speed, a day length, and an ultraviolet ray intensity; and
a calculation server for determining at least one operational condition of an air volume or an air temperature of the heat blower, based on at least one outdoor environment information among the outdoor temperature, the outdoor humidity, the outdoor wind speed, the day length, and the ultraviolet ray intensity, the control method of the heat blower system comprising steps of:
obtaining the at least one outdoor environment information from the information server;
providing the obtained outdoor environment information to the calculation server; and
obtaining at least one operational condition from the calculation server, wherein:
the heat blower comprises at least one of a transition-metal-fine-particle generator, an ion generator, an acid component generator, or a charged-particle-liquid generator, and
the control method of the heat blower system further comprises obtaining an operational condition of at least one generator among the transition-metal-fine-particle generator, the ion generator, the acid component generator, and the charged-particle-liquid generator of the heat blower, based on the obtained outdoor environment information; wherein the heat blower is a hair dryer.

7. The control method of the heat blower system according to claim 6, wherein:
the heat blower comprises the ion generator, the charged-particle-liquid generator, and a controller that controls the ion generator and the charged-particle-liquid generator to adjust a generation amount of ions and a generation amount of charged particle liquid, and
the controller decreases the generation amount of charged particle liquid while increasing the generation amount of ions, or increases the generation amount of charged particle liquid while decreasing the generation amount of ions.

8. A control method of a heat blower system, the heat blower system including:
a heat blower comprising a fan and a heater that are disposed in a housing;
a position measuring device for obtaining local information about a place where the heat blower is used, based on a position of the heat blower;
a timer comprising time information;
a weather information server comprising weather information;
an environment information calculation server for determining outdoor environment information from the local information, the time information, and the weather information; and
an operational condition calculation server for determining an operational condition of the heat blower system,
the control method of the heat blower system comprising steps of:
obtaining the local information about a place where the heat blower is used from the position measuring device;
obtaining time information about time when the heat blower is used from the timer;
obtaining the weather information from the weather information server;
providing the obtained local information, the obtained time information, and the obtained weather information to the environment information calculation server so that the environment information calculation server calculates the outdoor information from the local information, the time information, and the weather information;
obtaining the calculated outdoor environment information from the environment information calculation server;

providing the calculated obtained outdoor environment information to the operational condition calculation server; and obtaining at least one operational condition from the operational condition calculation server, wherein:

the heat blower comprises at least one of a transition-metal-fine-particle generator, an ion generator, an acid component generator, or a charged-particle-liquid generator, and the control method of the heat blower system further comprises obtaining an operational condition of at least one generator among the transition-metal-fine-particle generator, the ion generator, the acid component generator, and the charged-particle-liquid generator of the heat blower, based on the obtained outdoor environment information; wherein the heat blower is a hair dryer.

9. The control method of the heat blower system according to claim 8, wherein:

the heat blower comprises the ion generator, the charged-particle-liquid generator, and a controller that controls the ion generator and the charged-particle-liquid generator to adjust a generation amount of ions and a generation amount of charged particle liquid, and the controller decreases the generation amount of charged particle liquid while increasing the generation amount of ions, or increases the generation amount of charged particle liquid while decreasing the generation amount of ions.

* * * * *